No. 613,053. Patented Oct. 25, 1898.
A. B. BATES.
PACKING FOR PIPE JOINTS, &c.
(Application filed Nov. 8, 1897.)
(No Model.)
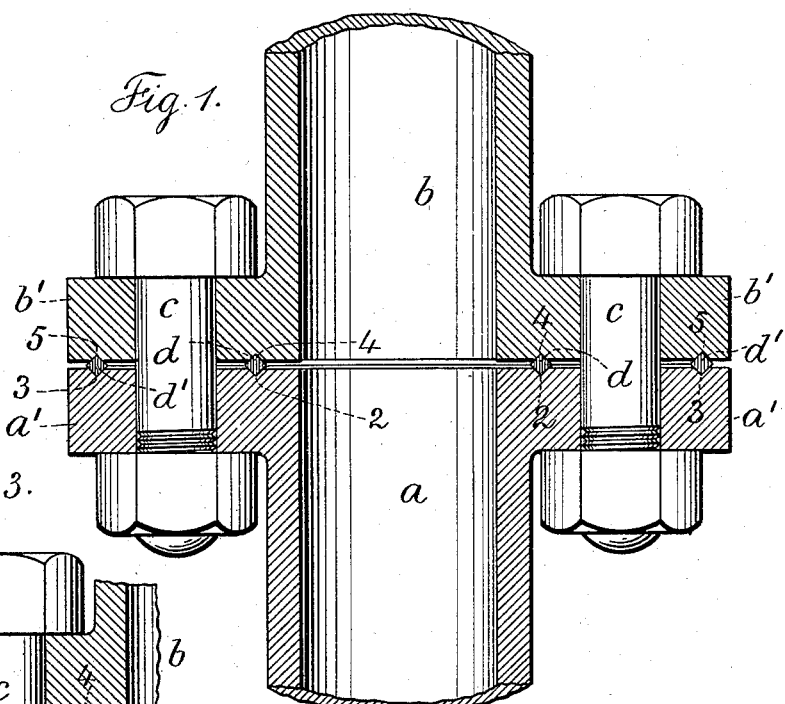
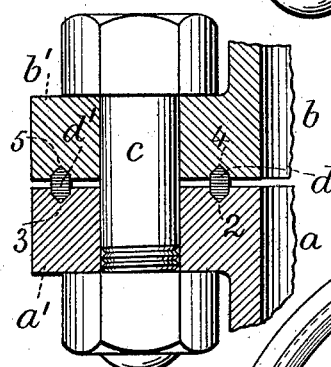
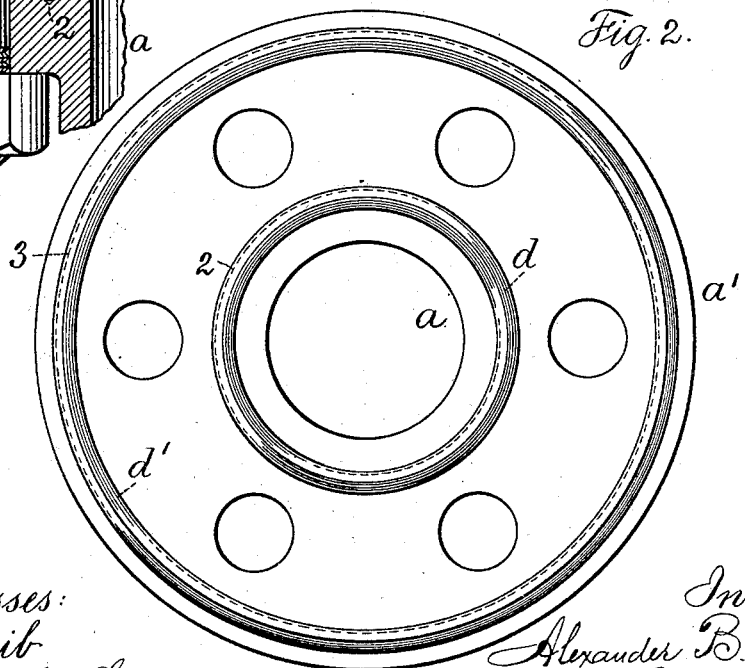
Witnesses:
J. Staib
Chas. H. Smith
Inventor:
Alexander B. Bates
by L. W. Serrell & Son
atty.

UNITED STATES PATENT OFFICE.

ALEXANDER B. BATES, OF BINGHAMTON, NEW YORK.

PACKING FOR PIPE-JOINTS, &c.

SPECIFICATION forming part of Letters Patent No. 613,053, dated October 25, 1898.

Application filed November 8, 1897. Serial No. 657,736. (No model.)

*To all whom it may concern:*

Be it known that I, ALEXANDER B. BATES, a citizen of the United States, residing at Binghamton, in the county of Broome and State of New York, have invented a new and useful Improvement in Packings for Pipe-Joints and Machinery, of which the following is a specification.

Heretofore packings for pipe and other joints have been made as rings of various sectional shapes and materials. These packing-rings have usually been placed between the opposite flat surfaces of the parts to be connected and the compressing action of the bolts flattened the packings between these surfaces. These packings hold with ordinary pressures, but with high pressures are not reliable.

In some instances packing-rings have been inserted into the grooved faces of the joints, but always within the clamping devices. In screwing up the flanges and compressing the packing-rings the bolts are subject to enormous strain, and this is particularly the case where there are elbows or bends in the pipes, and the flanges are liable to be broken by the twofold strain, one arising from the pressure of the fluid and the other from the force required in compressing the packing-ring, and this strain is increased by the leverage of the bolts, because the bolts are necessarily applied outside the packing-ring and in a circle or range of greater diameter, and the flanges through which the bolts pass are thus exposed to a force that frequently causes them to crack or break.

In the present invention I apply a second ring outside the circular range of bolts and of similar character to the packing-ring; but this second ring does not form a packing, because it in no respect would prevent leakage around the bolts; but it becomes an equalizer of the strain, so that the bolts draw the flanges toward each other without leverage strain and in such a manner that the outer ring becomes a support to the flange and insures the proper and uniform bearing pressure against the inner packing-ring, and in consequence of the packing-ring and the equalizing-ring being similar the compressing action of the bolts is uniform and the surfaces of the flanges remain parallel or nearly so.

In the drawings, Figure 1 is a vertical section of a pipe-joint; Fig. 2, a plan of one of the flange-faces, and Fig. 3 is a section showing a modification in the sectional shape of the packing-rings.

$a\ b$, Figs. 1 and 2, represent the pipe-sections, and $a'\ b'$ the flanges thereon connected by bolts $c$. The surface of the flange $a'$ is grooved concentrically at 2 3 within and outside of the line of bolts $c$, and the surface of the flange $b'$ is similarly grooved at 4 5, the grooves 2 and 4 and 3 and 5 being in pairs and opposite one another in the opposite faces of the flanges. These grooves are of V shape sectionally. Rings $d\ d'$ are of double-V shape, square, or diamond form in cross-section and correspond circumferentially with the grooves; but they are deeper than the combined depth of the grooves and are received and fit therein. Hence the flanges are maintained at a short distance apart. The bolts $c$ come between the rings, and when pressure is applied to the same to tighten the parts the rings are forced into the grooves, and the tendency is to spread them between the flanges in making a tight joint.

In the form shown in Fig. 3 the edges of the V-grooves are made with parallel sides, and the rings are thicker to render the joint more certainly tight by the rings when compressed and to increase the efficiency of the joint. The inner ring $d$ becomes a packing to retain the fluid-pressure, and the outer ring $d'$ is an equalizer of the strain.

My invention is not confined to the joints of pipes, but is applicable to all joints where ordinary gaskets are now employed and is applicable to the cylinder-heads of pumps and engines, to valve-chests, man and hand hole plates of boilers, and other covered openings where tight joints are required.

I claim as my invention—

In a joint having flat faces opposite to each other and bolts for connecting the parts, grooves of similar size and outline in both the adjacent surfaces, both within and outside of the line of bolts, and rings fitting and filling the grooves, the inner ring forming a packing and the outer ring an equalizer of the pressure by the bolts upon the joint, substantially as specified.

Signed by me this 5th day of November, A. D. 1897.

ALEX. B. BATES.

Witnesses:
GEO. T. PINCKNEY,
HAROLD SERRELL.